Inventors:
Marvin B. Fallgatter
Kauko E. Hallikainen
By
their Attorney

Patented Oct. 6, 1953

2,654,242

UNITED STATES PATENT OFFICE 2,654,242

MEASUREMENT OF WATER VAPOR IN GASES

Marvin B. Fallgatter, Piedmont, and Kauko E. Hallikainen, Berkeley, Calif., assignors to Shell Development Company, San Francisco, Calif., a corporation of Delaware Application July 7, 1950, Serial No. 172,444

4 Claims. (Cl. 73—29)

This invention pertains to analytical apparatus, and relates more particularly to an apparatus for quantitatively analyzing gaseous bodies for their water vapor content.

In many industrial and chemical processes, it is of importance to know the exact percentage of water present in a gas or gaseous mixture, for example, in the nitrogen gas which is commercially available in compressed form, in the hydrogen chloride gas used in the manufacture of ethyl chloride, etc.

Although many methods, such as those based on dew point or electrical conductivity determinations, have been proposed to measure small percentages of water in gases, these methods have drawbacks which often make them unsuitable, especially for industrial control purposes.

Thus, some of these methods require the use of special low temperature coolants, while others give rise to corrosion problems, especially when dealing with such materials as hydrogen chloride gas, and still others fail to give sufficiently reproducible results.

It is therefore an object of this invention to provide a method and apparatus for continuously measuring and/or recording the presence of small concentrations of water vapor, for example, in the range from about one hundred to about ten parts or less per million by volume, in a non-condensible gaseous medium.

It is also an object of this invention to provide a method and an apparatus for adiabatically expanding a gaseous body containing moisture, causing the attendant cooling effect to form within the gaseous body a cloud by condensation, the light transmittance or its reciprocal, the opacity, of said cloud being a function of the moisture content of said gaseous body, photoelectrically measuring said light transmittance or opacity, and recording its value, if desired, directly in per cent water content of the gaseous body.

These and other objects of this invention will be understood from the following description taken with reference to the appended drawings, wherein.

Figure 1:
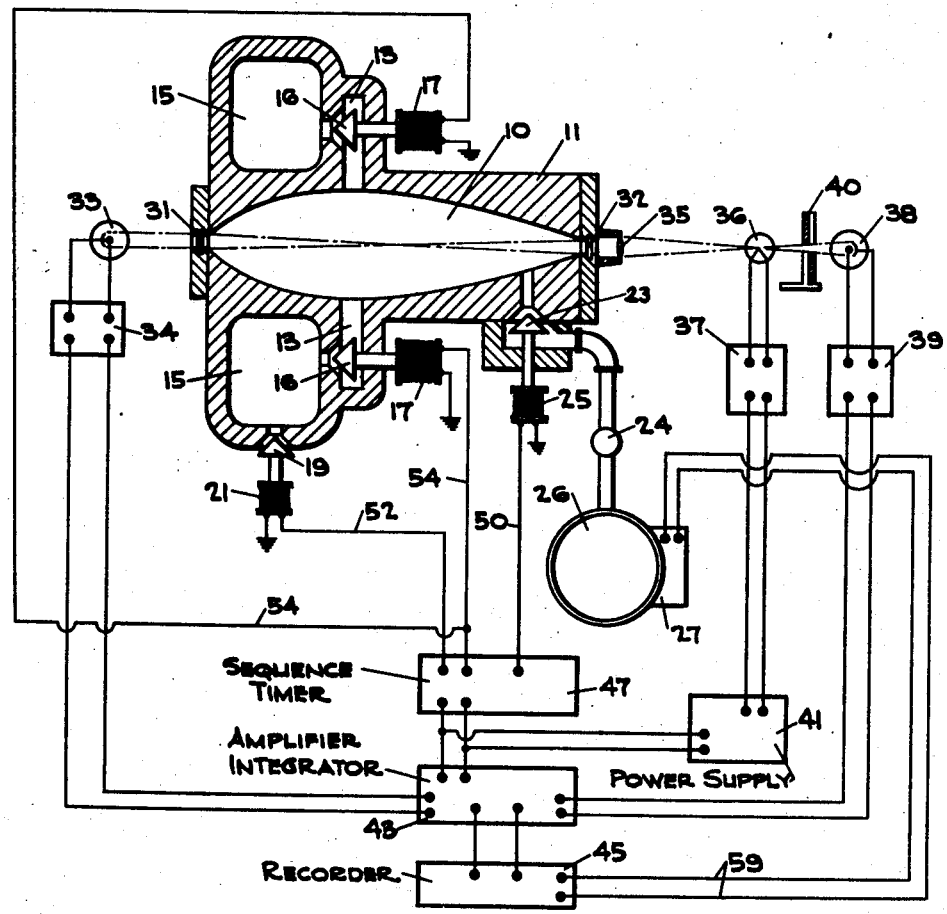
Fig. 1 is a schematic diagram of the apparatus used to carry out the present invention.

Referring to Fig. 1, a closed expansion chamber 10 is formed within a housing 11, made of a suitable metallic and preferably corrosion-proof material sufficiently strong to withstand pressures of the order of 200 lbs./sq. in. or more. The expansion chamber 10 is preferably given an elongated streamlined or tear-drop shape to eliminate turbulence effects which occur upon expansion and cloud formation, and may result in incorrect light readings. The expansion chamber is in communication, through passages 13 with one or more surge zones or chambers, Fig. 1 showing a single surge chamber 15 having the shape of an annulus mounted coaxially with the longitudinal axis of chamber 10. It is preferred that passages 13 open to the expansion chamber approximately at points where the section of the chamber perpendicular to its longitudinal axis has its greatest value. The flow of gas from chamber 10 to chamber 15 is controlled by valves 16 operated by a solenoid, motor mechanism, or other suitable actuator 17. The surge chamber 15 is provided with an exhaust valve 19, opening to the atmosphere or any relatively low-pressure zone, valve 19 being controlled by an electrical motor, solenoid mechanism or other suitable actuator 21. Gas is admitted to the expansion chamber by means of an injection valve 23, controlled by a suitable actuator 25. Said gas is supplied from a source 26, which may be any vessel or zone where said gas is stored or manufactured. In the latter case, 27 diagrammatically indicates any agency, such as a heater, dehydrator, mixer, etc., whereby the water vapor content of the gas in zone 26 may be varied or controlled. Between the source 26 and the injection valve 23 is a pressure-regulating device 24 which enables the initial equilibrium pressure of the sample gas in chamber 10, after valve 23 is opened, to be fixed at a predetermined suitable value.

The housing 11 is provided with windows 31 and 32, designed to withstand the pressures within the chamber 10 and preferably aligned along the longitudinal axis of said chamber. Disposed along the straight line continuing said axis to one side of housing 11 is a light-sensitive device or measuring photocell provided, if desired, with a preamplifier 34. Disposed along said line to the other side of housing 11 is a collimating lens 35 and a light-source 36, energized from an independent constant-voltage supply or a voltage regulator 37.

Arranged in the vicinity of the light-source, although not necessarily along the same axial line, is a second light-sensitive means or reference photocell 38. An adjustable screen device, such for example as a light diaphragm or iris mechanism diagrammatically shown at 40 serves to control the amount of light falling on photocell 38 from the source 36. These photocells may be of any desired type, such as of the vacuum tube or of the self-generating type.

Figure 3:
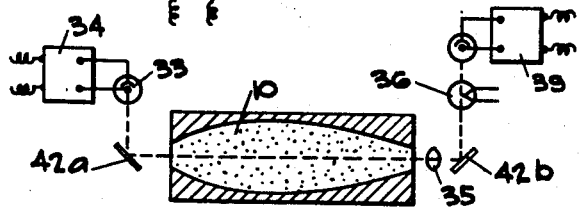

It should be particularly emphasized that Fig. 1 merely illustrates one of the possible arrangements of the light-train elements described above. Fig. 3 shows, by way of example, a light-train system comprising all the elements of Fig. 1 and provided in addition with two light-deflecting elements 42a and 42b, such as mirrors or prisms. From Fig. 3 it will be apparent that it is not necessary that the light source or either or both the light-sensitive means be positioned on the axial line joining the windows of the expansion chamber. The light train system must thus satisfy only one essential condition, namely, that it should enable the light-source to project a light beam directly on the reference photocell, and another light beam on the measuring photocell through the gaseous body within the expansion chamber.

Figures 2, 4:
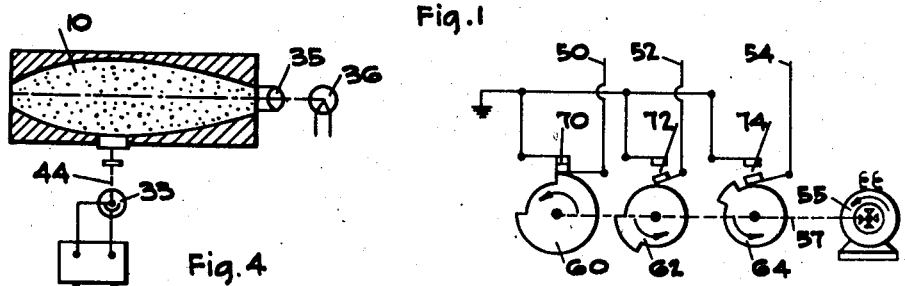
Fig. 2 is a diagrammatic representation of the sequence timer unit of Fig. 1.
Figs. 3 and 4 are simplified diagrams showing variations of the system of Fig. 1.

It is however to be understood that the photoelectric observation and measurement of the light-transmitting properties of the cloud are not limited to measurements of opacity or absorption of transmitted light, as illustrated in Figs. 1 and 3, but may alternatively involve the measurement and recording of the scattered light component, which may be observed at any desired angle to the axis of the collimated beam, including a right angle, as illustrated in Fig. 4 with regard to a beam 44 produced by the scattering of the light by the condensation droplets formed in chamber 10.

The electrical network connecting the system units described above comprises a power supply 41, an electronic amplifier-integrator or comparator unit 43, a measuring device and recorder 45, and a sequence timer unit 47, which may be of any conventional mechanical or electronic type.

The operation of the system is as follows. With the circuits energized from the power supply 41, the amount of light directed to the measuring photocell 33 by lamp 36 through the lens 35 and chamber 10 is compared, by means of the measuring device 45, with the amount of light directed to the reference photocell 38. This is effected, in a manner readily understood by those skilled in electronics, by comparing the output current of photocell 33 with that of photocell 38 after suitable amplification by preamplifiers 34 and 39 and the amplifier unit 43.

Although it is actually possible to dispense with the reference photocell 38, and to calibrate the measuring device 48 directly in terms of absolute values of the signals from the measuring photocell 33, this may in some cases lead to inaccuracies caused by zero drift, changes in signal amplitude due to variations of light intensity or ambient temperature, etc. It is therefore preferred to eliminate these inaccuracies by the use of a system wherein the signals from the measuring photocell are matched against those of the reference photocell, as will appear hereinbelow.

After the output currents from photocells 33 and 38 have been balanced by adjustment of the diaphragm 40 and/or the amplifier circuits 34, 39 or 43, gas is admitted from vessel 26 to the expansion chamber 10, expanded from there into the surge chamber 15, and finally exhausted to the outside. Although it is possible to perform all these operations by hand, that is, by opening the valves 23, 16 and 19 manually, it is advantageous, when performing a continuous process of analysis, especially for purposes of industrial control, to effect these operations automatically over equal and continuous cycles.

By way of illustration, Fig. 2 diagrammatically shows a sequence timer arrangement wherein a motor 55, rotating for example at 1 R. P. M. drives a shaft 57 mounting cams 60, 62 and 64, adapted to close, at predetermined moments and for a predetermined time, the switches 70, 72 and 74 controlling the flow of current in leads 50, 52 and 54 of Fig. 1, thus giving a desired sequence of operations of the corresponding inlet and exhaust valves.

When the expansion valves 16 from the expansion chamber 10 to the surge zone 15 are suddenly opened, the pressure in the expansion chamber, which may have had a value such as 200 lbs./sq. in. gauge, drops to a much lower value predetermined by the ratio of the volumes of the expansion and the surge chambers. The attendant cooling effect causes an almost instantaneous formation, for about one second's duration, of a cloud of condensed moisture in the chamber 10. The opacity of said cloud, that is, its overall effect on the amount of light passing therethrough, may be said to be a function of the density of said cloud, of its magnitude or volume, and of its time of duration, all of which are in turn functions of the per cent of water vapor contained in the gas supplied to chamber 10. Since the light beams from source 36 impinging upon the measuring photocell 33 have to pass through said cloud, the measuring photocell receives at this time less light than the reference photocell. The resulting drop of potential in the output of the measuring photocell, after suitable amplification and comparison with the output potential of the reference photocell in the unit 43, is measured and/or recorded by means of recorder 45, calibrated, if desired, directly in per cent moisture content of the gas from 26.

One method of measuring the opacity properties of the cloud may consist in measuring and recording, by a proper adjustment of the units 43 and 45, the time period between the first appearance of the cloud until its substantially complete disappearance or dissipation by evaporation, since this period, as stated above, is a function of the water content of the gas being tested.

Preferably, however, the measurements involve a combination of opacity and time duration measurements, and particularly, the measurement and recording of the amplitude v. time integral of the pulse of photoelectric response to each successive cloud formed in the chamber by successive expansions, as described hereinabove, and as readily effected by electronic means such as shown at 43 and 45.

It is understood that the present system may be operated without a special surge chamber, the gas in chamber 10 being expanded directly to the space outside said chamber, which forms a natural surge zone having an atmospheric pressure normally lower than that of the expansion chamber. It is however much preferred to use the system described and illustrated above, since greater accuracy and reproducibility of results is achieved by expanding the gas into a surge chamber having a predetermined volume ratio to the expansion chamber.

It is important that this volume ratio, or, in the case of expansion to the atmosphere, the corresponding pressure ratio, be suitably chosen in relation to such factors as the temperature and pressure of the gas just before expansion, the kind of gas to be tested, its particular ratio of specific heat at constant pressure to specific heat at constant volume, the upper and lower limits of water content to be measured, etc.

It is well known that a momentary cooling results from an adiabatic expansion of a gas, which in the case of an ideal gas is expressed by:

$$T_1 = T_0 \left(\frac{P_1}{P_0}\right)^{\frac{Y-1}{Y}}$$

where $T_0$ and $T_1$ are, respectively, the absolute temperatures of the gas before and after expansion; $P_0$ and $P_1$ are respectively the absolute pressures of the gas before and after expansion, and Y is the ratio of specific heat at constant pressure to specific heat at constant volume for the gas being measured.

If the pressure ratio $$\left(\frac{P_1}{P_0}\right)$$

is chosen, by the adjustment of initial and final pressures, or of the ratio of the surge chamber volume to expansion chamber volume, so that the temperature $T_1$ is just below the dew point of the gas being tested, then, upon adiabatic expansion, there will be momentarily produced a just perceptible cloud of condensed water vapor. It is possible, therefore, to choose a fixed expansion ratio which, in accordance with the above, will give adiabatic cooling to a temperature below the apparent dew point of the gaseous sample of lowest initial water content. The condensation is the more complete, the farther below true dew-point the temperature reached by adiabatic cooling; also the condensation is in the form of more numerous and smaller droplets. Both of these factors enhance the optical density of the cloud and the sensitivity of the photo-electric measurements. On the other hand, the greater expansion which is required for greater cooling reduces the total amount of water vapor remaining in the expansion chamber, which in turn reduces the optical density. High expansion rates promote the formation of extremely small droplets, which also tends to reduce the optical density, if the droplets are so small that the light-scattering effect is lessened. Furthermore, since small droplets evaporate more quickly, the time-integral method of measurement, which is one of the preferred ways of carrying out the present invention, will become less sensitive.

Consequently, a working value of pressure ratio is chosen to give suitable adiabatic cooling between the two extremes outlined above, the most favorable region of expansion ratio being preferably determined by calculations based on the equation given hereinabove and checked by experimental tests. Thus, for example, it has been determined that for gases having an initial water content of from 0.003 to 0.1 per cent by volume and a value of $Y=1.40$, pressure ratios in the range of 0.25 to 0.4 may be advantageously used.

If it is desired to use the method and apparatus of the present invention for purposes of direct automatic control of industrial installations, the indications of recorder 45 may be applied, through leads 59, to control the operation of the unit 27, which in turn controls the amount of moisture present in the gas of tank 26.

We claim as our invention:

1. A system for determining the amount of water vapor in a gas comprising an expansion chamber having streamlined inner walls of a generally tear-drop shape, valved inlet means for admitting a gas under pressure into said expansion chamber, an annular surge chamber surrounding said expansion chamber, valved outlet means for exhausting said surge chamber, normally closed passage means in communication between the expansion and the surge chambers, said passage means opening to the expansion chamber at a section thereof having approximately the largest diameter, valve means in said passage means for reducing the pressure of the gas in the expansion chamber by adiabatically expanding it into the surge chamber, whereby a condensation cloud is formed in said expansion chamber by the attendant cooling of the gas to a temperature below the dew point, light-train means comprising light-source and light-sensitive means arranged exteriorly of said expansion chamber and fluid tight translucent windows formed in the walls of said expansion chamber, said light-train means being disposed to pass a light beam from said light source to said light-sensitive means through the gas gas within the expansion chamber, and means energized by said light-sensitive means for indicating the effect of the cloud formed in said expansion chamber on the intensity of said light beam.

2. A system for determining the amount of water vapor in a gas comprising an expansion chamber having streamlined inner walls of a generally tear-drop shape, valved inlet means for admitting a gas under pressure into said expansion chamber, an annular surge chamber surrounding said expansion chamber, valved outlet means for exhausting said surge chamber, normally closed passage means in communication between the expansion and the surge chambers, said passage means opening to the expansion chamber at a section thereof having approximately the largest diameter, valve means in said passage means for reducing the pressure of the gas in the expansion chamber by adiabatically expanding it into the surge chamber, whereby a condensation cloud is formed in said expansion chamber by the attendant cooling of the gas to a temperature below the dew point, light-train means comprising a light-source and two photocells arranged exteriorly of said expansion chamber and two fluid-tight translucent windows formed in the walls of the expansion chamber, said light-train means being disposed to project a light beam from said source directly to one of said photocells and to project another light beam from said source to the other photocell through the windows of said expansion chamber, and measuring means energized by the output currents of said two photocells for comparing the intensity of the light beams impinging on said two photocells.

3. A method of determining the presence of water vapor in a gas wherein said water vapor is present in amounts from 0.003 to 0.1 per cent by volume, comprising the steps of adiabatically expanding said gas from an initial absolute pressure $P_0$ to a final absolute pressure $P_1$, thereby causing a cloud of water condensation to be formed in the gas by the attendant cooling of the gas from an initial absolute temperature $T_0$ to a final absolute temperature $T_1$ below the dew point, the value of the expansion ratio $P_1/P_0$ being selected in the range from 0.25 to 0.4 for gases having a ratio of specific heat at constant pressure to specific heat at constant volume of about 1.4, projecting beams of light from a source of light toward two points along two paths, one of said paths passing through said cloud, integrating the amounts of light reaching said two points over the time period between the formation and the disappearance of said cloud, and comparing these amounts as an index of the water vapor present in the gas.

4. A system for determining the amount of water vapor in a gas, comprising an expansion chamber having streamlined inner walls of a generally tear-drop shape, valved inlet means for admitting a gas under pressure into said expansion chamber, a surge chamber adjacent said expansion chamber, valved outlet means for exhausting said surge chamber, normally closed passage means in communication between the expansion and the surge chambers, said passage means opening to the expansion chamber at a section thereof having approximately the largest diameter, valve means in said passage for reducing the pressure of the gas in the expansion chamber by adiabatically expanding it into the surge chamber, whereby a condensation cloud is formed in said expansion chamber by the attendant cooling of the gas to a temperature below the dew point of the gas, light-train means comprising light-source and light-sensitive means arranged exteriorly of said expansion chamber and fluid tight translucent windows formed in the walls of said expansion chamber, said light-train means being disposed to pass a light beam from said light source to said light-sensitive means through the gas within the expansion chamber, and means energized by said light-sensitive means for indicating the effect of the cloud formed in said expansion chamber on the intensity of said light beam.

MARVIN B. FALLGATTER.
KAUKO E. HALLIKAINEN.

References Cited in the file of this patent

UNITED STATES PATENTS

| Number | Name | Date |
| --- | --- | --- |
| 1,794,222 | Whitney | Feb. 24, 1931 |
| 1,945,660 | Scott | Feb. 6, 1934 |
| 1,969,626 | Simon et al. | Aug. 7, 1934 |
| 2,299,529 | Crampton | Oct. 20, 1942 |
| 2,484,202 | Wintermute | Oct. 11, 1949 |
| 2,566,307 | Boyle | Sept. 4, 1951 |
| 2,593,313 | Kamm et al. | Apr. 15, 1952 |